United States Patent
Noel et al.

(10) Patent No.: US 9,504,932 B2
(45) Date of Patent: Nov. 29, 2016

(54) WASTE WATER EVAPORATOR

(71) Applicant: E3 Solutions, LLC, Tampa, FL (US)

(72) Inventors: Jamey Scott Noel, Grand Junction, CO (US); Jeffrey Morris Sullivan, Bemidji, MN (US); William McBride Blanchard, Tampa, FL (US)

(73) Assignee: E3 Solutions, LLC, Tampa, FL (US)

( * ) Notice: Subject to any disclaimer, the term of this patent is extended or adjusted under 35 U.S.C. 154(b) by 561 days.

(21) Appl. No.: 13/836,541

(22) Filed: Mar. 15, 2013

(65) Prior Publication Data

US 2014/0262055 A1    Sep. 18, 2014

(51) Int. Cl.
  *B01D 1/16*  (2006.01)
  *B01D 1/20*  (2006.01)
  *B01B 1/00*  (2006.01)
  *B01D 1/00*  (2006.01)

(52) U.S. Cl.
  CPC .............. *B01D 1/20* (2013.01); *B01B 1/005* (2013.01); *B01D 1/0082* (2013.01); *B01D 1/16* (2013.01); *Y02W 10/37* (2015.05)

(58) Field of Classification Search
  CPC ........ B01D 1/20; B01D 1/16; B01D 1/0082; C02F 1/00; Y02W 10/37; B01B 1/005
  USPC ....... 239/223, 265.11, 7, 128; 417/173, 366, 417/372
  See application file for complete search history.

(56) References Cited

U.S. PATENT DOCUMENTS

| | | | | |
|---|---|---|---|---|
| 2,287,795 A | * | 6/1942 | Hall ......................... | B01D 1/18 159/4.2 |
| 3,400,918 A | * | 9/1968 | MaClaren .......... | B01F 3/04539 210/220 |
| 3,480,263 A | * | 11/1969 | Davidson ................. | F24F 3/12 261/29 |
| 3,669,422 A | * | 6/1972 | Nogaj ................ | B01F 3/04773 210/242.2 |
| 3,779,531 A | * | 12/1973 | White ................ | B01F 3/04539 210/219 |
| 4,013,504 A | * | 3/1977 | Morris ..................... | B01D 1/18 159/4.06 |
| 4,211,365 A | | 7/1980 | Friedl et al. | |
| 4,455,226 A | | 6/1984 | Lahav | |
| 4,704,189 A | | 11/1987 | Assaf | |

(Continued)

OTHER PUBLICATIONS

Automated Mechanical Evaporation Systems & Software from SMI: SmartH2O. www.evapor.com/evaporation-smarth2O.html. Date accessed: Nov. 6, 2013.
Ledebuhr Industries for Proptec Rotary Atomizers. Part #: PT100-*PM01AAAX%202D. Date of Issue: Jun. 1, 2011. Date accessed Nov. 6, 2013.

*Primary Examiner* — Arthur O Hall
*Assistant Examiner* — Chee-Chong Lee
(74) *Attorney, Agent, or Firm* — David Hendricks; Smith & Hopen, P.A.

(57) ABSTRACT

An atomizer for use in waste water evaporation includes a motor having a rotor shaft, at least one conduit for receiving the waste water, a housing supporting the motor and the at least one conduit, and a hub having a plurality of holes for distributing waste water in the form of water droplets. The motor is a variable speed motor and is cooled by waste water flowing through the at least one conduit. The hub is connected to the rotor shaft and spins at a variable speed with the rotor shaft. The atomizer may be used in a waste water evaporation system that further includes an anemometer and a control system. The control system receives a wind speed input from the anemometer and provides a signal to the variable speed motor to adjust the speed of the variable speed motor and hub, thereby adjusting the water droplet size in response to varying wind conditions.

10 Claims, 8 Drawing Sheets

(56) References Cited

U.S. PATENT DOCUMENTS

Figure 1:
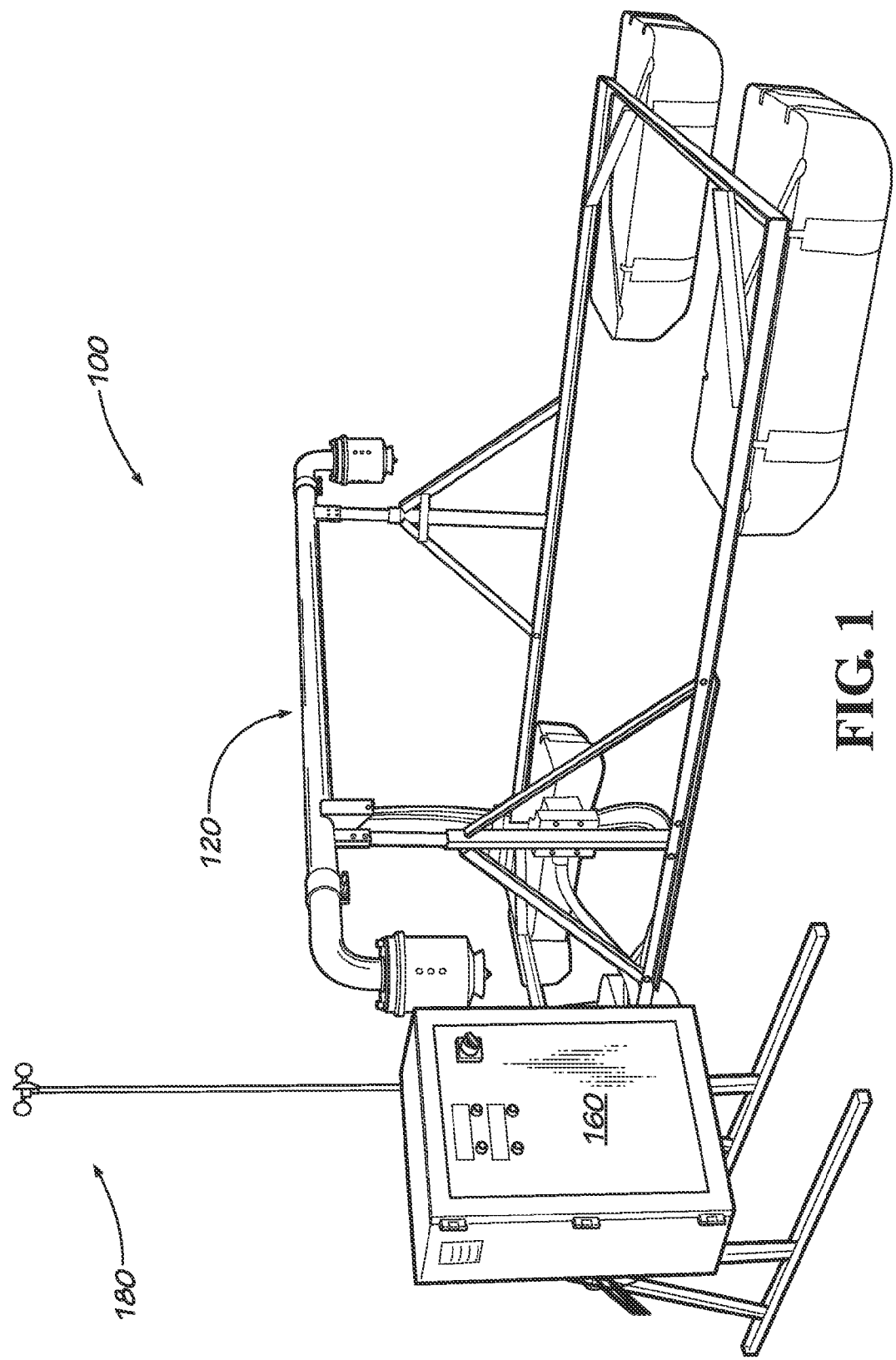
Figure 2:
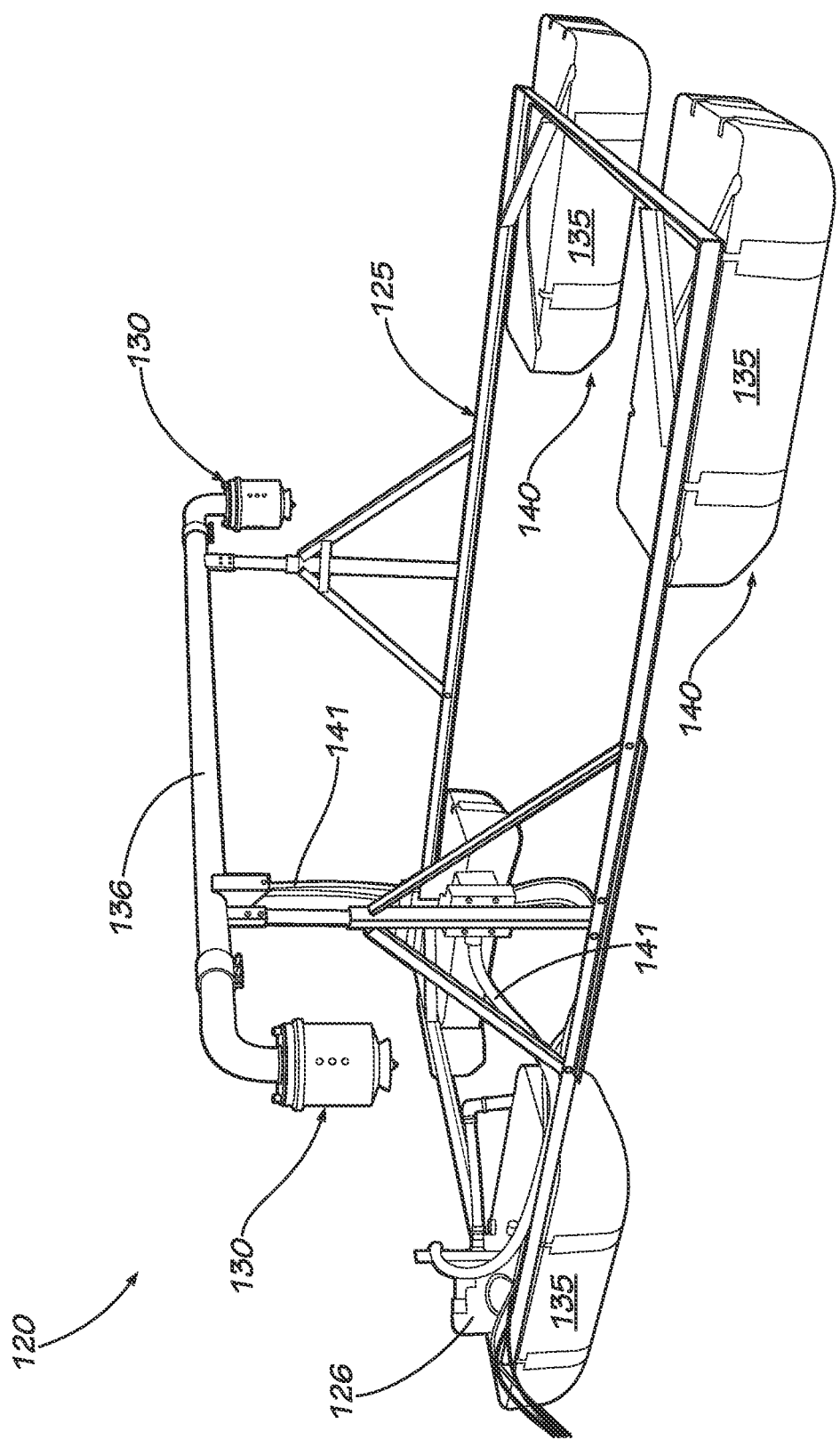
Figure 3:
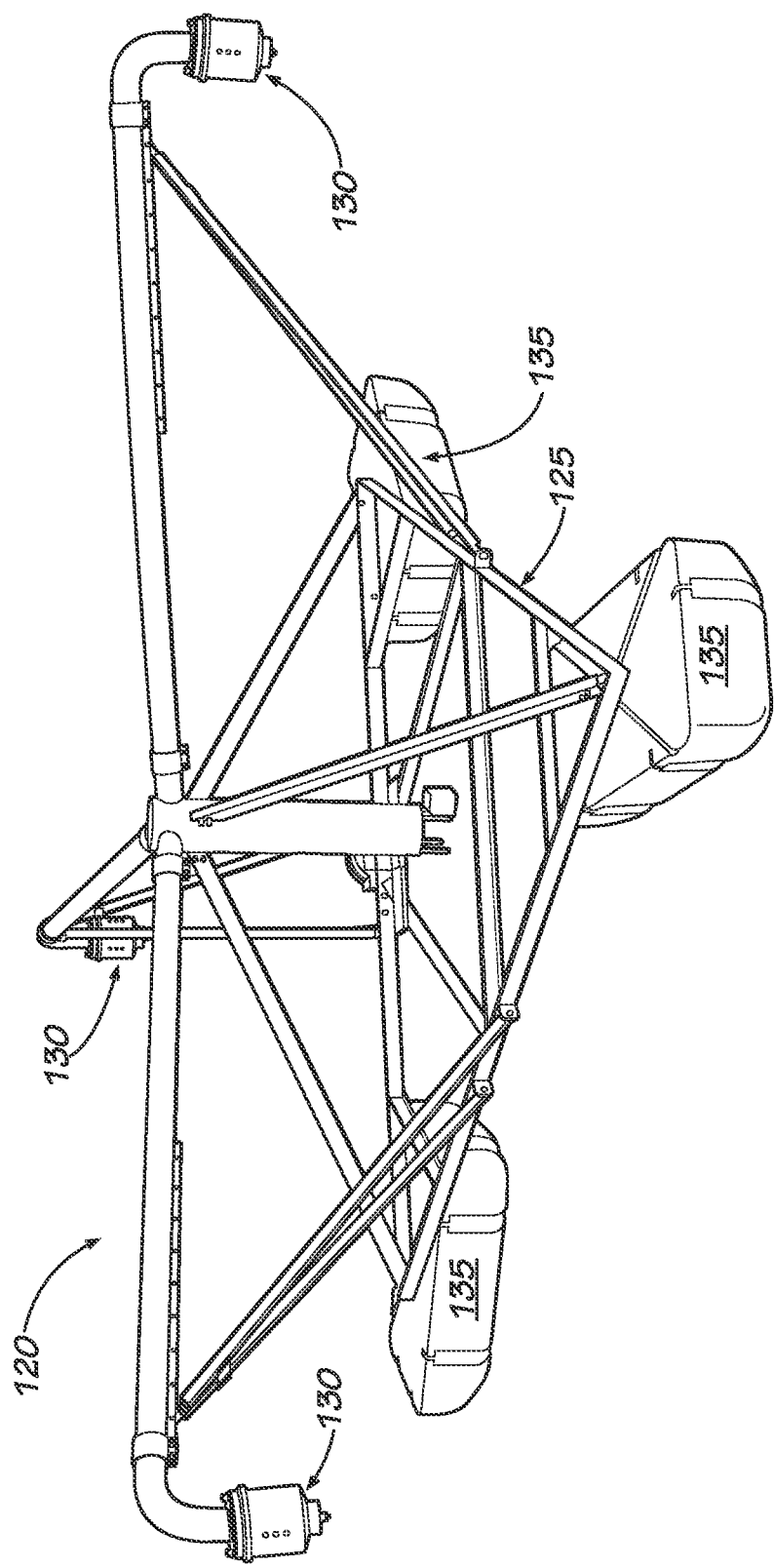
Figure 5:
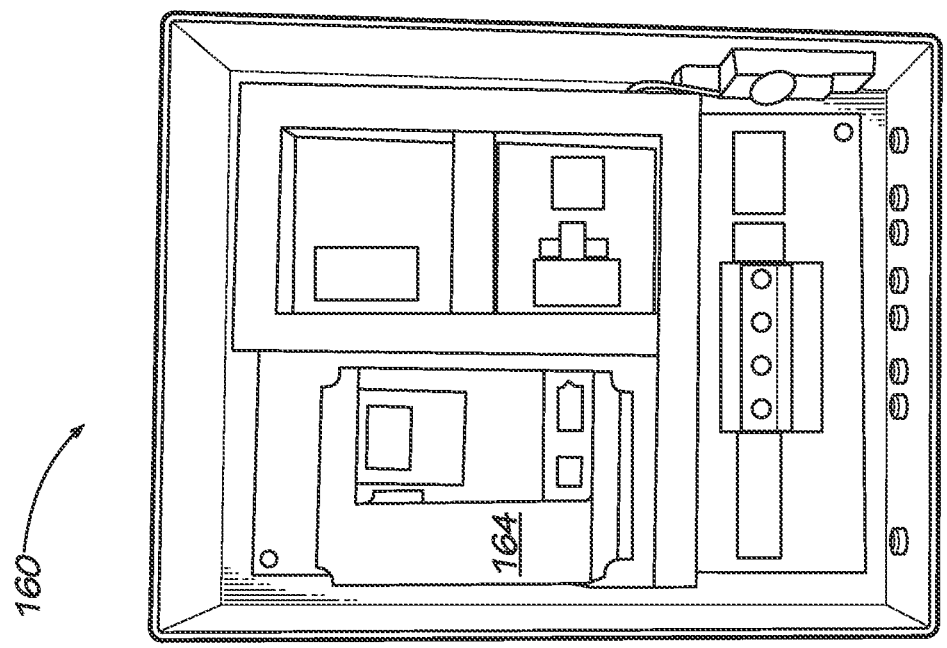
Figure 4:
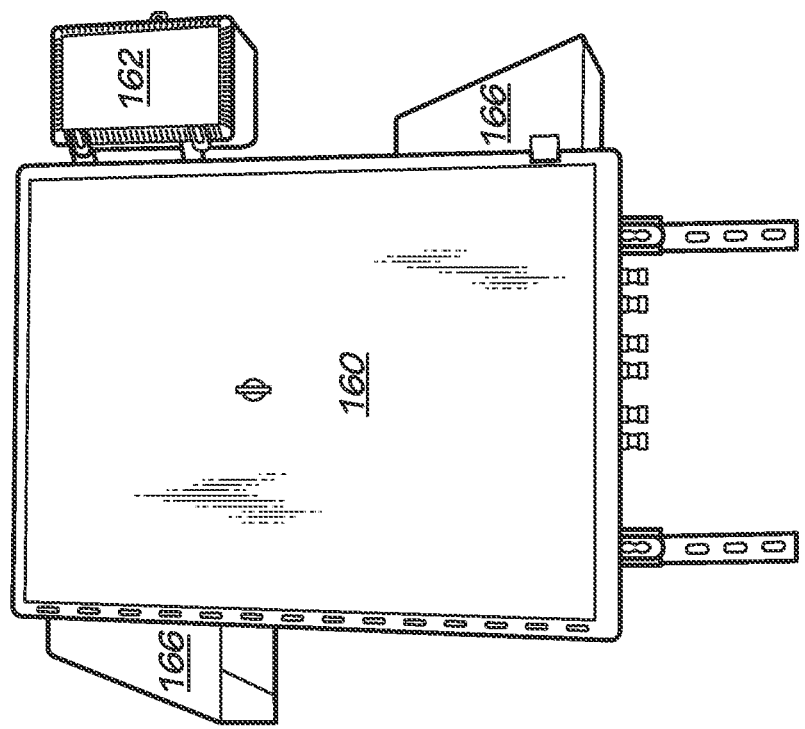
Figure 6:
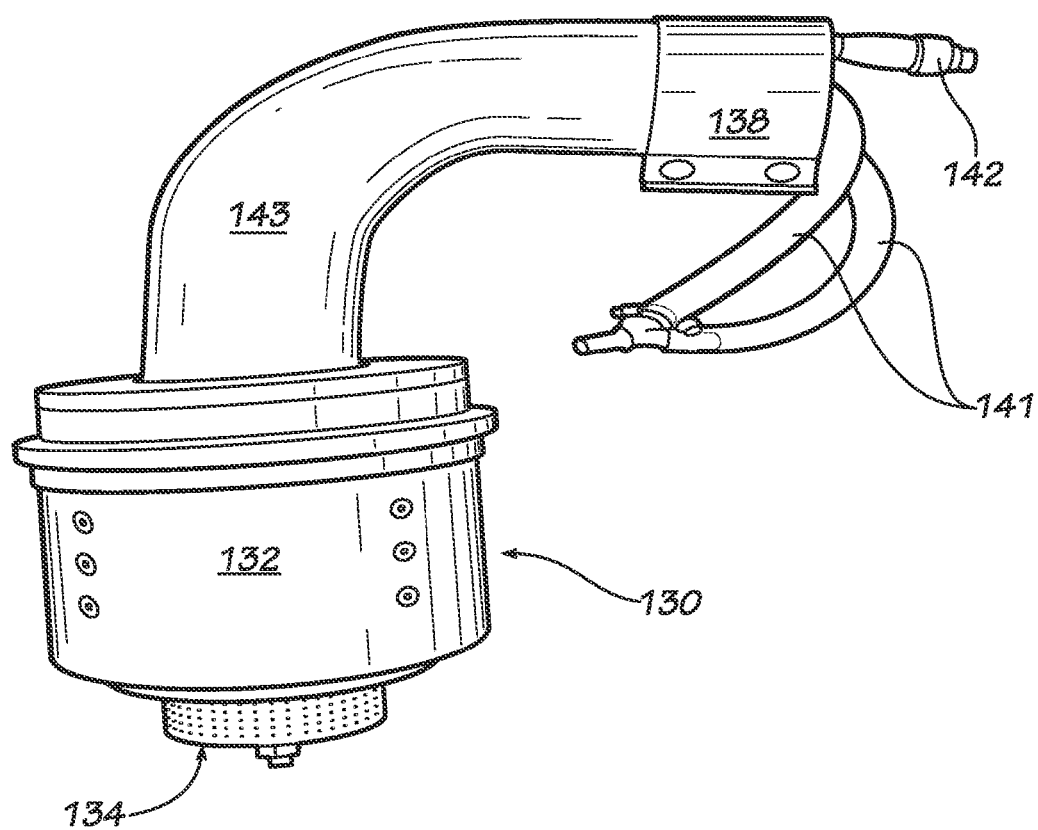
Figure 7:
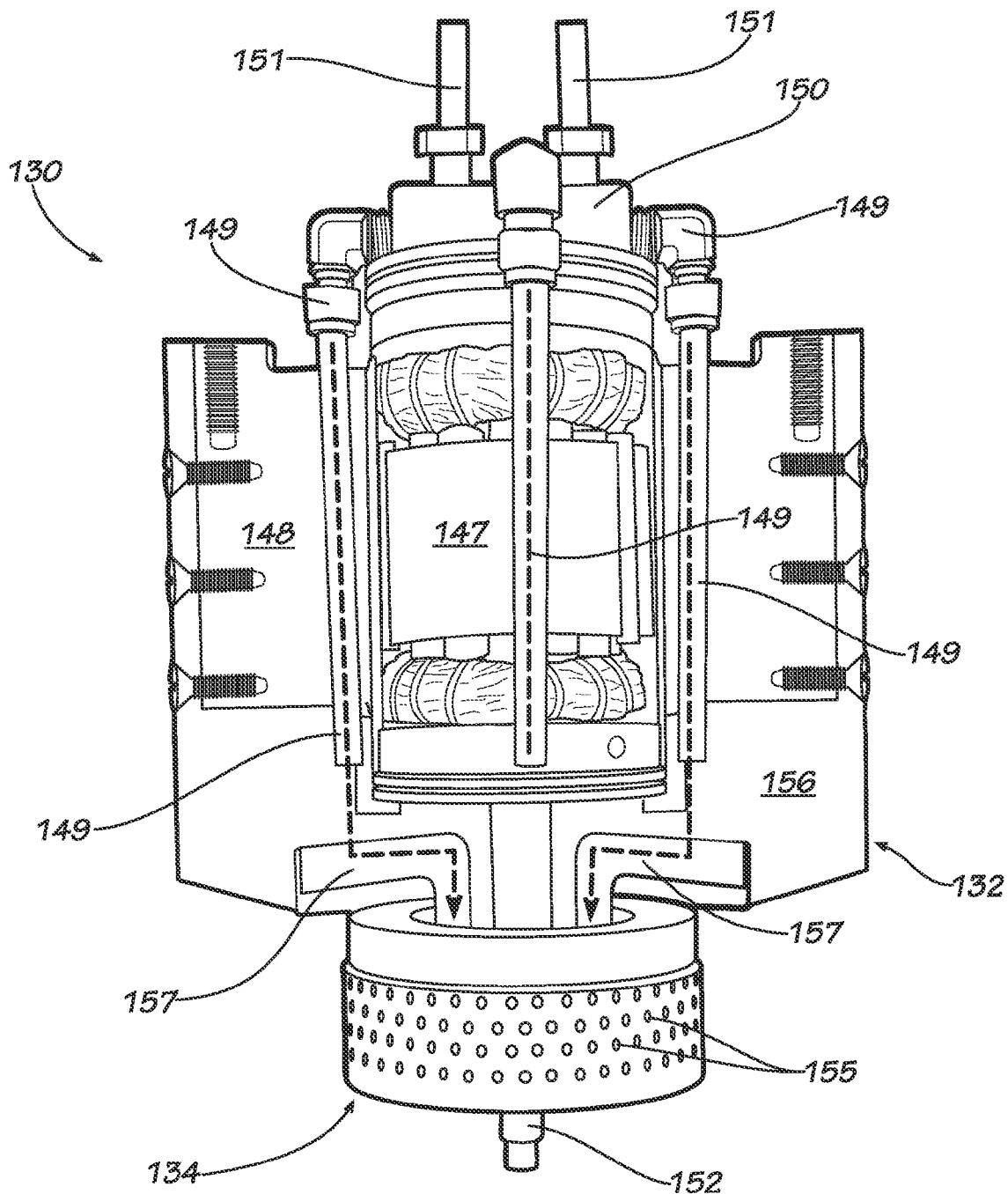
Figure 8:
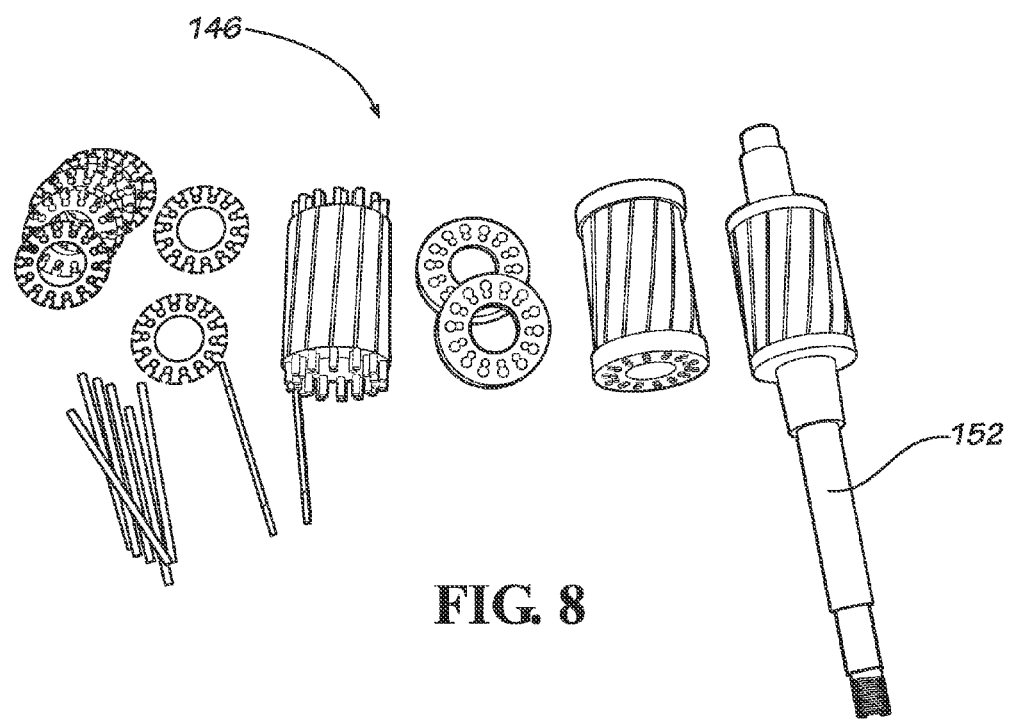
Figure 9:
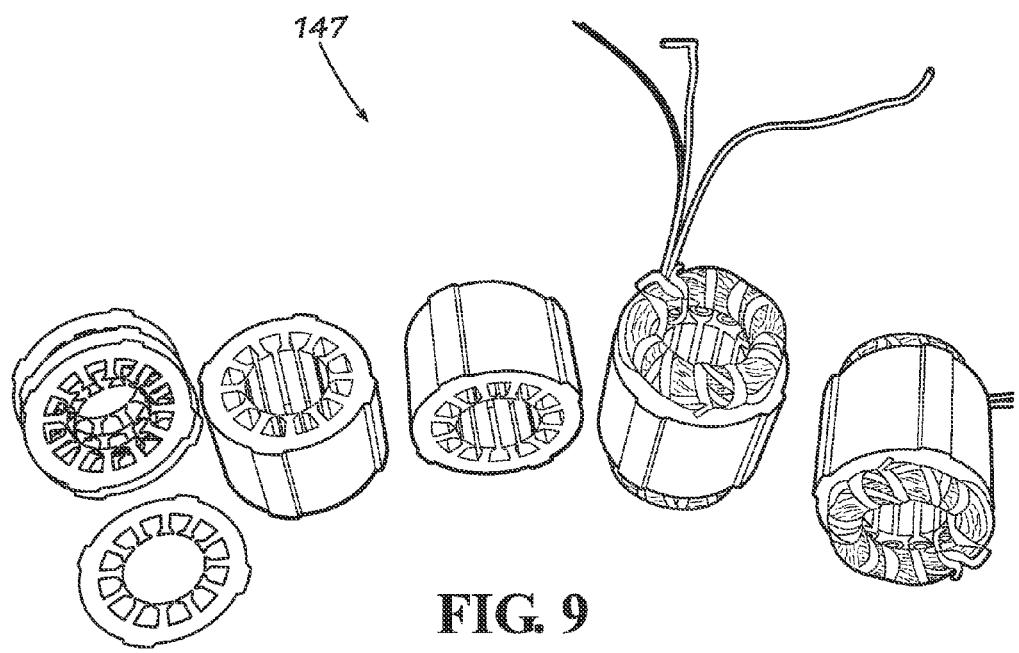
Figure 10:
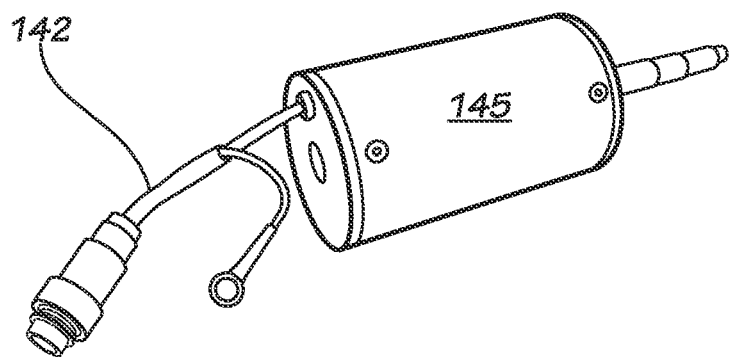
Figure 11:
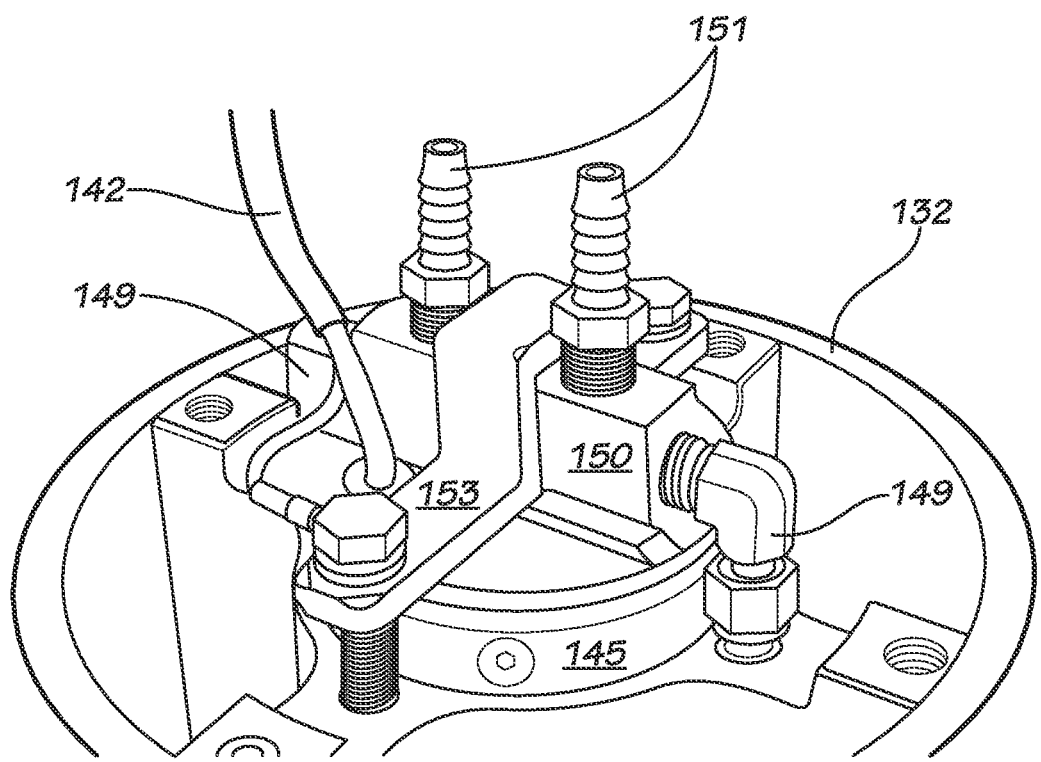

| | | | |
|---|---|---|---|
| 6,318,705 B1 * | 11/2001 | MacLaren | B01F 3/04539 210/628 |
| 7,166,188 B2 | 1/2007 | Kedem et al. | |
| 7,604,710 B2 | 10/2009 | Haslem et al. | |
| 8,016,977 B2 | 9/2011 | Rasmussen et al. | |
| 8,283,818 B2 | 10/2012 | Hassett et al. | |

* cited by examiner

WASTE WATER EVAPORATOR

FIELD OF THE INVENTION

The present invention relates to the field of waste water evaporation, and more particularly to an evaporator system that promotes efficient evaporation of waste water from ponds such those found in industrial and agricultural operations while minimizing or eliminating environmental contamination problems from pollutants carried by wind drift.

BACKGROUND

Surplus waste water is a byproduct of many industrial and agricultural operations around the world and disposing of it in a responsible and affordable manner is a substantial issue for industry today. One of the most common and proven methods for reducing waste water involves using large evaporation ponds lined with black plastic where ambient temperatures and sunlight safely evaporate the waste water and slowly lower the water level. This natural distilling process leaves the toxic solids in the pond and evaporates the purified water into the air. For several years various types of evaporation equipment have been developed which spray (atomize) the water into the air in fine droplets to help accelerate the evaporation rate.

However, more recently conventional evaporation equipment and methods have been found to be polluting the soil and vegetation surrounding the storage pond because the uncontrolled mist is drifting with wind conditions. Environmental regulations and restrictions are on the rise and these conventional methods and equipment are being banned and restricted from use at an increasing rate around the world.

Current methods and equipment in the evaporation industry focus on creating large uncontrolled clouds of atomized wastewater that are directed upward and away from the evaporation pond. While these systems may move impressive volumes of fluid, it has been found that contaminants from the wastewater are simply drifting into surrounding trees and contaminating soil or being carried into the wind stream because true evaporation did not separate the toxic particles from the pure water. This is especially true in conditions where the wind is blowing at more than about 4 mph, where conventional systems must generally be shut down until the wind subsides.

In particular, there is a growing need for improved evaporation equipment in the oil and gas industry. The use of hydraulic fracturing and new horizontal drilling methods are enabling companies to tap vast new quantities of natural gas and previously unreachable domestic oil reserves. Prospects look promising for what some have called a century's worth of cleaner abundant energy. However, as effective as these new fracturing and drilling methods are, there is a growing concern about the large amounts of water required for well production and the wastewater being generated therefrom.

In addition, increasing environmental regulations and concerns are limiting the options for safe, affordable and effective disposal of waste water. This is not only being felt in the oil and gas industry, but also in agriculture where the storage of surplus waste water threatens to contaminate soil, water and air.

There is thus a need for effective, practical and environmentally friendly waste water treatment and reduction.

SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Systems and methods described herein provide for efficient, cost effective and environmentally friendly disposal of surplus industrial and agricultural waste water. These systems and methods minimize drift due to wind and contain the atomized spray pattern to the water body while efficiently accelerating true evaporation.

In an embodiment, an atomizer for use in waste water evaporation includes a motor having a rotor shaft, at least one conduit for receiving the waste water, a housing supporting the motor and the at least one conduit and a hub having a plurality of holes for distributing waste water in the form of water droplets. The motor is a variable speed motor and is cooled by waste water flowing through the at least one conduit, and the hub is connected to the rotor shaft and spins at a variable speed with the rotor shaft. The variation of the speed of the motor and hub changes the droplet size of the water droplets.

In other embodiments, the atomizer includes a plurality of conduits for receiving the waste water and cooling the motor.

In further embodiments, the housing includes at least one channel for receiving waste water from the at least one conduit and providing the waste water to the hub.

In certain embodiments, the housing includes a manifold for distributing waste water to the at least one conduit.

In yet other embodiments, the manifold, the plurality of conduits and the plurality of channels are all formed from corrosion-resistant materials.

In some embodiments, the corrosion-resistant materials are selected from the group consisting of nylon, stainless steel and ultra-high molecular weight polyethylene.

In other embodiments, the motor is a high efficiency 2 hp, 3 phase, 240 or 480 volt variable speed AC motor adjustable from a speed of about 750 to about 14,000 rpm.

In further embodiments, the plurality of holes in the hub have a nominal ⅛" diameter.

In certain embodiments, a waste water evaporation system includes an anemometer, a control system and an atomizer assembly, the atomizer assembly having at least one atomizer mounted on a frame, and a variable speed motor and a hub connected to the motor, the hub having a plurality of holes for distributing waste water from the atomizer in the form of water droplets. The control system receives a wind speed input from the anemometer and provides a signal to the variable speed motor to adjust the speed of the variable speed motor and hub connected thereto, thereby adjusting the droplet size of the water droplets.

In yet other embodiments the atomizer assembly includes at least one pontoon for floating the atomizer assembly above the surface of a body of waste water.

In some embodiments, the at least one pontoon has a beveled edge.

In further embodiments, the atomizer has an exterior surface and the frame and exterior surface are formed from corrosion-resistant materials.

In certain embodiments the corrosion-resistant materials are selected from the group consisting of stainless steel, ultra-high molecular weight polyethylene, aluminum, polyurethane, polyvinyl chloride, steel, nylon carbon fiber and titanium.

In other embodiments the atomizer assembly weighs from about 400 to about 800 pounds.

In an embodiment a method for evaporating waste water includes locating an atomizer assembly on the surface of a waste water pond, the atomizer assembly having at least one atomizer mounted on a frame, the atomizer having a variable speed motor and a hub connected to the motor, the hub having a plurality of holes for distributing waste water from the atomizer in the form of water droplets. An anemometer measures wind speed at the waste water pond and provides the measured wind speed to a control system. The control system provides a signal to the variable speed motor to adjust the speed of the variable speed motor and hub connected thereto, thereby adjusting the droplet size of the water droplets based on the wind speed measurement.

In some embodiments, the control system provides a signal to decrease the speed of the variable speed motor and hub when the anemometer measures an increase in wind speed, thereby increasing the droplet size of the water droplets and reducing the risk that the wind will carry the water droplets away from the waste water pond.

In other embodiments, the atomizer further includes at least one conduit and a housing supporting the motor and the at least one conduit. The waste water is pumped through the housing through the at least one conduit to remove heat generated by the motor.

In further embodiments, the housing, the at least one conduit and the hub are formed from corrosion-resistant materials in order to minimize corrosion of these components from the waste water.

BRIEF DESCRIPTION OF THE DRAWINGS

Illustrative embodiments of the present invention are described in detail below with reference to the following drawing figures:

FIG. 1 is a perspective view of a water evaporation system according to an embodiment of the invention.

FIG. 2 is a perspective view of an atomizer assembly according to the embodiment of FIG. 1.

FIG. 3 is a perspective view of an atomizer assembly according to another embodiment of the invention.

FIG. 4 is a front view of a control system according to an embodiment of the invention.

FIG. 5 is a front view of the control system according to FIG. 4 showing the internal components of the system.

FIG. 6 is a side view of an atomizer according to an embodiment of the invention.

FIG. 7 is a side cross-section view of the atomizer according to FIG. 6.

FIG. 8 is a top perspective view showing motor rotor components according to an embodiment of the invention.

FIG. 9 is a top perspective view showing motor stator components according to an embodiment of the invention.

FIG. 10 is a top perspective view of a motor according to an embodiment of the invention.

FIG. 11 is a top perspective view of internal components of an atomizer according to an embodiment of the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

With reference to FIGS. 1 and 2, in one embodiment a water evaporator system 100 includes an atomizer assembly 120, a control system 160 and an anemometer 180.

The atomizer assembly 120 includes a frame 125 and at least one atomizer 130. The frame 125 may include at least one pontoon 135 for supporting the assembly 120 above the surface of a body of water such as a retention pond. Alternatively, the frame 125 may be anchored at a fixed location above the surface of the pond. The at least one atomizer 130 may be supported on the frame by hollow piping 136 such as, but certainly not limited to, black UV resistant ultra-high molecular weight polyethylene ("UHMW PE"). The piping 136 may contain the tubing 141 and wires 142 (see FIG. 6) which provide water and power to the at least one atomizer 130. The piping 136 may be weatherproof and corrosion resistant, which protects the internal components from weather and corrosive effects of the waste water.

The at least one pontoon 135 may have one or more beveled edges 140. The beveled edge 140 provides a relatively smooth surface so that when the frame 125 is deployed into the body of water and in use the edge 140 of the pontoon 135 is less likely to cut or otherwise damage the plastic pond liner (if present).

In one embodiment such as that shown in FIGS. 1 and 2, the atomizer assembly 120 includes two atomizers 130 mounted thereon. In other embodiments, such as that shown in FIG. 3, the atomizer assembly 120 includes three atomizers 130 mounted thereon. In other embodiments (not shown), the atomizer assembly includes one atomizer or even more than 3 atomizers mounted thereon.

A pump 126 draws water from the pond and supplies it to the atomizer(s) 130 via tubing 141 (see FIGS. 2 and 6). As shown in the figures, the pump 126 is mounted to the frame 125, although it will be recognized that other types of pumps, such as a submersible pump, may be used. In one embodiment, the pump is an electric ¾ to 1½ hp water or air-cooled pump that provides up to around 20 gallons per minute (gpm) flow to the one or more atomizers 130. With two or three atomizers 130 in use, each atomizer can disperse approximately 5-7 gpm of water. It will be recognized, however, that the size of the atomizer(s) or other operating conditions can be adjusted to provide for higher or lower dispersion rates as desired.

The atomizer assembly 120 is preferably relatively lightweight such that it can be deployed by two or three personnel without the use of heavy equipment. Light weight is achieved through the use of light weight materials for the frame, including but not limited to stainless steel, pressure cast ultra-high molecular weight polyethylene ("UHMW PE"), aluminum, polyurethane, polyvinyl chloride (PVC), steel, nylon, carbon fiber and titanium. Light weight for the atomizer assembly 120 is also achieved through the use of engineering plastics including but not limited to UHMW PE, nylon, acetal, polyurethane and PVC for the piping 136 and tubing 141. In some embodiments, pontoon(s) 135 may be formed from, foam-filled polyethylene, although these are certainly not limited to these materials.

In certain embodiments, the atomizer assembly 120 weighs less than about 1000 pounds, or less than 700 pounds, or even less than 500 pounds. In other embodiments, the atomizer assembly weighs from about 400 to about 800 pounds or from about 400 to about 500 pounds. This relatively low weight allows a minimum number of workers (2-4) to launch the atomizer assembly into the pond without the use of heavy equipment, in marked contrast to currently available systems which weigh much more (well over 1000 pounds) and require heavy machinery for deployment.

The materials described above for use in the atomizer assembly 120 are preferably corrosion resistant. If corrosion resistant materials are used, components coming into contact with the waste water will be able to withstand corrosive saline solutions and other chemical environments found in various waste water applications.

The frame 125 may have an adjustable height so that the height of the atomizer(s) 130 relative to the water level may be adjusted up or down as desired based on operating conditions.

The anemometer 180 measures wind speed and provides this measurement to the control system 160. In response to the wind speed indication from the anemometer 180, the control system 160 adjusts the speed of the at least one atomizer 130, resulting in a variation in the size of water droplets exiting the atomizer 130. When wind speed is high, larger and heavier droplets are formed so that the wind does not carry them as far (retaining them substantially within the pond); lower wind speeds allow smaller droplets to be formed because transport or drift of small droplets outside the pond area is not as much of a concern. It will be appreciated that while smaller droplet sizes are generally preferable to larger ones because smaller droplets provide more surface area for evaporation, it is still desirable to have the ability to operate the atomizers in higher wind conditions even though the larger droplet size results in less overall evaporation.

An exemplary view of a control system 160 according to an embodiment of the invention is shown in FIGS. 4 and 5. The control system 160 may include programmable wind control electronics 162, which receive the wind speed input from the anemometer and provide this data to a variable frequency drive 164. Based on the wind speed input, the variable frequency drive 164 determines the desired speed for the hub 134 (see FIG. 6) on the atomizer 130 and provides the appropriate signal to the atomizer 130 on the frame 125 of the atomizer assembly 120, which during operation is located on the waste water pond. A wire 142 (portions of which can be seen in FIGS. 6, 10 and 11) connects the variable frequency drive 164/control system 160 to the at least one atomizer 130. The control system 160 may also include one or more filters 166 such as HEPA filters for providing cooling air to the components of the control system 160, including the variable frequency drive 164. The filter(s) 166 also remove corrosive moisture and contaminants from the cooling air, which may be expected to be present in the air if the control system 160 is located near the waste water pond.

With reference to FIGS. 6-11, an atomizer 130 according to an embodiment of the invention includes a protective housing 132 for containing and protecting the components of the atomizer 130 and a hub 134 for dispersing water provided to the atomizer 130 by the pump 126 via tubing 141. The hub 134 may be formed of a corrosion resistant thermoplastic or other suitable material. The atomizer 130 is supported on the frame by piping 143, which contains the tubing 141 and wires 142. A clamp 138 connects the piping 143 to piping 136 on the frame 125. As discussed above, piping 136 further carries the tubing 141 to the pump 126 and eventually the waste water in the pond and also carries wires 142 to pump 126 and the control system 160. While embodiments shown in the figures depict piping 136 and piping 143 as separate components, it will be appreciated that this piping could be integrally formed with the atomizer 130 directly attached to the piping at the top of its protective housing 132.

In certain embodiments, the atomizer 130 is a centrifugal atomizer. The atomizer may have a variable speed, which allows the speed of the hub 134 and resulting water particle sizes to be adjusted by the control system 160 based on wind conditions measured by the anemometer 180.

The atomizer includes a motor 145. In one embodiment, the motor is an AC motor including a rotor 146 and stator 147. AC power is applied to the stator 147 via wire 142, generating a rotating magnetic field that turns the rotor 146, which is connected to a rotor shaft 152, which is connected to hub 134, causing the hub 134 to spin.

In certain embodiments, the motor 145 is a high efficiency 2 hp, 3 phase, 240 or 480 volt AC motor. It may be desirable for the motor 145 to have a waterproof plug to provide further protection from the environment. The motor may have an adjustable speed of from about 750 to about 14,000 rpm. The speed of the motor 145 is changed by a signal from the variable frequency drive 162 in the control system 160. More specifically, the speed of the motor 145 is changed by changing the frequency (in Hertz) applied to the motor 145, which is controlled by the variable frequency drive 162 in the control system 160.

In some embodiments, the stator 147 includes bonded (not welded) laminations designed for high efficiency at high temperatures. They may be designed for inverter duty and include spike-resistant magnet wire. The rotor 146 may be a double-cage squirrel cage copper bar rotor, which provides both high efficiency and high torque starting. In certain embodiments the rotor shaft 152 may be formed from stainless steel, although other construction materials are certainly possible.

In yet other embodiments, the atomizer 130 and in particular the motor 145 is water-cooled. Specific components of the atomizer 130 that provide this feature are shown in, e.g., FIGS. 7 and 11. Water to be dispersed by the atomizer 130 is provided via pump 126 and tubing 141, which is connected to ports 151 located on the atomizer. Ports 151 are connected to a manifold 150, which distributes the water past the motor 145 (proximate the stator 147) via conduits 149. The manifold may be formed of stainless steel or other suitable material. The water is then distributed to the hub 134 and dispersed as set forth below. The flow path of water through the atomizer 130 and around the motor 145/stator 147 is shown in FIG. 7 with dotted lines. Water flowing past motor 145/stator 147 removes heat therefrom. In this manner, the water to be dispersed provides a cooling function to the motor 145 and other components of the atomizer 130.

Further, because the motor 145 is water-cooled, no fan is needed on the rear of the motor, which eliminates scale buildup on the motor which could eventually cause imbalance and premature motor failure and/or impose additional maintenance requirements. In addition, because the corrosive waste water fluids only contact corrosion-resistant materials in the atomizer 130 (e.g., nylon, stainless steel, UHMW and other corrosion resistant materials), corrosion of the atomizer components is minimized, resulting in longer life and less down time.

In certain embodiments, a bar clamp 153 connects the motor 145 to the protective housing 132 of the atomizer. In some embodiments the protective housing 132 may include an outer covering of a corrosion-resistant material such as UHMW PE and a heat sink 148 formed from aluminum or other suitable material for providing structural support to the motor 145 and other components of the atomizer 130 and removing heat from the motor 145 and providing it to the conduits 149 to be carried away by the waste water. The atomizer 130 may also include a mold 156 formed from a material such as (but not limited to) UHMW PE which provides additional support to the atomizer 130 and includes channels 157 for moving the water from the conduits 149 to the hub 134. Certain components may also be formed of nylon or other corrosion-resistant materials.

The hub 134 includes a plurality of holes 155. As explained above, water provided to the atomizer 130 via pump 126 and tubing 141 is pumped to the hub 134, which disperses the water into droplets through holes 155 by centrifugal force. As the motor slows down (as determined by the control system 160 in response to, for example, an increase in wind speed), the rotor 146 and rotor shaft 152 also slow down, reducing the speed at which the hub 134 spins. This reduction in speed (with a constant flow of water to the atomizer) increases the droplet size so that the droplets are heavier and are not carried as far by the wind. For example, in some embodiments if no wind is detected by the anemometer 180 the variable frequency drive 164 will adjust the frequency of the motor 145 so that the rotor 146 and rotor shaft 152 rotate at approximately 7200 rpm so as to form droplets having a droplet size of approximately 70 micron. With a wind speed of 20 mph, the frequency of the motor 145 is adjusted so that the rotor 146 and rotor shaft 152 rotate at approximately 1000 rpm so as to form droplets having a droplet size of approximately 300 micron.

In certain embodiments the plurality of holes are nominally ⅛" diameter holes located in a plurality of rows, although the hole size may be varied depending on other variables. This relatively high orifice size is capable of handling a complex mix of waste water contaminants while minimizing the risk of plugging of the holes.

Embodiments of the atomizer 130 described above thus create a consistent spray pattern of waste water without peripheral fines at a variety of speeds while allowing for the manipulation of the droplet size to mitigate drift in high wind conditions.

For example, conventional dispersion technologies have resulted in visible contamination such as white salt buildup on surrounding trees and soil up to 200 feet away from the perimeter of the waste water pond. In contrast, an embodiment according to the present invention was tested on an approximate 2.5 acre waste water pond operated by North Bill Disposal in Douglas, Wyo., and showed a substantial improvement as compared to conventional technologies, with maximum drift limited to about 40 feet in winds as high as about 45 mph, with no contamination exceeding the perimeter of the pond.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. An atomizer for use in waste water evaporation, comprising:
   a motor comprising a rotor shaft, the rotor shaft comprising a longitudinal axis;
   at least one conduit for receiving waste water;
   a housing supporting the motor and the at least one conduit within the housing such that the at least one conduit is positioned in proximity to the motor in order to absorb heat produced by the motor; and
   a cylindrical hub comprising a central axis and an outer surface disposed around and spaced apart from the central axis, and a plurality of holes in the outer surface for distributing the waste water as water droplets, the water droplets comprising a droplet size;
   wherein the motor is a variable speed motor and is cooled by the waste water flowing through the at least one conduit and the hub is connected to the rotor shaft such that the central axis of the cylindrical hub is aligned with the longitudinal axis of the rotor shaft and the hub is configured to spin about the central axis at a variable speed with the rotor shaft.

2. The atomizer of claim 1, wherein variation of a rotational speed of the motor and hub changes the droplet size of the water droplets.

3. The atomizer of claim 1, wherein the housing further comprises at least one channel for receiving waste water from the at least one conduit and providing the waste water to the hub.

4. The atomizer of claim 1, wherein the housing further comprises a manifold for distributing waste water to the at least one conduit.

5. The atomizer of claim 1, wherein the atomizer comprises a manifold for distributing waste water to the plurality of conduits and the housing further comprises a plurality of channels for receiving waste water from the plurality of conduits and providing the waste water to the hub.

6. The atomizer of claim 5, wherein the manifold, plurality of conduits and plurality of channels are all formed from corrosion-resistant materials.

7. The atomizer of claim 6, wherein the corrosion-resistant materials are selected from the group consisting of nylon, stainless steel and ultra-high molecular weight polyethylene.

8. The atomizer of claim 1, wherein the motor is a high efficiency 2 horsepower, 3 phase, 240 or 480 volt variable speed AC motor adjustable from a speed of about 750 to about 14,000 revolutions per minute.

9. The atomizer of claim 1, wherein the rotational speed of the motor is adjustable from about 750 to about 14,000 revolutions per minute.

10. The atomizer of claim 1, wherein the plurality of holes comprises holes having a nominal ⅛" diameter.

* * * * *